(12) United States Patent
Reinert (10) Patent No.: US 9,649,970 B2
(45) Date of Patent: May 16, 2017

(54) PORTABLE LOADING AND TRANSPORTING APPARATUS

(71) Applicant: Barry G. Reinert, Salina, KS (US)

(72) Inventor: Barry G. Reinert, Salina, KS (US)

( * ) Notice: Subject to any disclaimer, the term of this patent is extended or adjusted under 35 U.S.C. 154(b) by 106 days.

(21) Appl. No.: 14/686,261

(22) Filed: Apr. 14, 2015

(65) Prior Publication Data

US 2016/0304021 A1    Oct. 20, 2016

(51) Int. Cl.
*B60P 3/04* (2006.01)
*B60P 1/48* (2006.01)

(52) U.S. Cl.
CPC ............... *B60P 1/483* (2013.01); *B60P 3/04* (2013.01)

(58) Field of Classification Search
CPC .. B60P 1/6427; B60P 1/32; B60P 3/04; B60P 1/483; B65G 57/302; A01K 1/0272
USPC ............... 298/10; 119/400; 414/111, 461, 24
See application file for complete search history.

(56) References Cited

U.S. PATENT DOCUMENTS

| | | | |
|---|---|---|---|
| 2,567,178 A * | 9/1951 | Bird ...................... | B60P 1/5428 414/529 |
| 3,053,372 A | 9/1962 | Gallagher | |
| 3,614,068 A | 10/1971 | Koehl | |
| 3,720,052 A * | 3/1973 | Anderson ............. | A01D 85/004 100/100 |
| 3,777,715 A * | 12/1973 | Hill .......................... | A61D 3/00 119/733 |
| 3,910,438 A * | 10/1975 | Anderson ............. | A01D 85/004 100/100 |
| 3,970,045 A | 7/1976 | Graham, Jr. | |
| 4,101,081 A | 7/1978 | Ritter et al. | |
| 4,278,390 A * | 7/1981 | Ahearn ................... | B66F 9/065 414/549 |
| 4,303,258 A * | 12/1981 | Davis ...................... | B60P 3/04 119/400 |
| 4,583,907 A * | 4/1986 | Wimberley ............. | B66F 9/065 414/685 |
| 4,821,679 A | 4/1989 | Hackert | |
| 5,381,757 A | 1/1995 | Putney | |
| 5,584,637 A * | 12/1996 | Jensen, Sr. ........... | A01D 87/127 414/111 |
| 6,467,433 B1 | 10/2002 | Stanton et al. | |
| 6,499,435 B2 | 12/2002 | Markham | |
| 6,792,892 B2 | 9/2004 | Craig | |
| 7,146,933 B1 | 12/2006 | Dubas | |

(Continued)

*Primary Examiner* — Kristen C Hayes
*Assistant Examiner* — Ebony Evans
(74) *Attorney, Agent, or Firm* — Dale J. Ream (57) ABSTRACT

A portable loading and transporting apparatus includes a containment pen having a floor, a pair of side panels extending upwardly therefrom, and a front panel extending between the side panels. Centering plates are mounted to the opposed side panels, respective centering plates being pivotally coupled to ends of loading arms such that the containment pen is operatively moved between a loaded configuration atop the bed of a truck and an unloaded configuration on the ground rearwardly proximate the bed of the truck when the loading arms are actuated. A stabilizer bar includes a first end selectively coupled to a first position on the containment pen and a second end selectively coupled to a first position on the bed of the truck, the stabilizer bar configured to maintain the containment pen in a level configuration when the containment pen is moved between the loaded and the unloaded configurations.

12 Claims, 7 Drawing Sheets (56) References Cited

U.S. PATENT DOCUMENTS

| | | |
|---|---|---|
| 7,210,427 B1 | 5/2007 | Dillman |
| 7,237,510 B2 | 7/2007 | White |
| 8,534,981 B1* | 9/2013 | Bortz .................... B60P 1/486 |
| | | 414/462 |
| 8,720,379 B2 | 5/2014 | Moreno et al. |
| 2006/0070580 A1* | 4/2006 | Klene .................... A01K 5/01 |
| | | 119/60 |
| 2012/0042833 A1 | 2/2012 | Gunn et al. |
| 2015/0366159 A1* | 12/2015 | Nagely ................ A01K 13/00 |
| | | 119/400 |

* cited by examiner

PORTABLE LOADING AND TRANSPORTING APPARATUS

BACKGROUND OF THE INVENTION

This invention relates generally to containment devices such as livestock and hay containment devices and, more particularly, to a portable loading and transporting apparatus configured for containing and transporting articles and livestock on the bed of a transport truck.

Livestock gates and pens are commonly used to corral animals on farms. Similarly, wire panels and gated frames are often mounted to the bed of a truck and are configured to transport animals to and from areas of food and shelter or even to a respective sale barn. Other structures are used to lift and transport articles like round bales of hay. Although these devices are presumably effective for their intended purposes, they do not provide a containment pen that may be loaded with livestock, hay, or other articles and then the entire containment pen loaded onto the bed of a truck, transported to another location, and then unloaded to the ground—all without the use of a tractor or other powered equipment separate from the truck.

Therefore, it would be desirable to have a portable loading and transporting apparatus that is configured to contain livestock, food items, and other articles and to be loaded and unloaded from the bed of a truck having a hay bale loading assembly mounted thereto. Further, it would be desirable to have a portable loading and transporting apparatus having a containment pen that may be descended upon an animal and then the animal secured therein for loading and transport. In addition, it would be desirable to have a portable loading and transporting apparatus that is selectively adapted to transport and dump its contents in a controlled manner.

SUMMARY OF THE INVENTION

A portable loading and transporting apparatus according to the present invention is useful with a bale loading device having a pair of loading arms pivotally coupled to a rear end of the bed of a truck, the portable loading and transporting apparatus including a containment pen having a floor, a pair of opposed side panels extending upwardly from respective side edges of the floor, and a front panel extending between the side panels. A pair of centering plates is mounted to the opposed side panels, respectively, the pair of centering plates being pivotally coupled to respective distal ends of the pair of loading arms such that the containment pen is operatively moved between a loaded configuration atop the bed of the truck and an unloaded configuration on the ground rearwardly proximate the bed of the truck when the loading arms are actuated. A stabilizer bar includes a first end selectively coupled to a first position on the containment pen and a second end selectively coupled to a first position on the bed of the truck, the stabilizer bar configured to maintain the containment pen in a level configuration when the containment pen is moved between the loaded and the unloaded configurations by operation of the loading arms.

Therefore, a general object of this invention is to provide a portable loading and transporting apparatus having a containment pen configured to receive livestock and other items and be loaded atop a truck bed by a traditional hay bale loading device.

Another object of this invention is to provide a portable loading and transporting apparatus, as aforesaid, having floor structures that open and close so that the apparatus can be descended over an animal or cargo to capture and contain it for loading and transport.

Still another object of this invention is to provide a portable loading and transporting apparatus, as aforesaid, having a stabilizer arm selectively configured to maintain the containment pen in a level orientation or to tip rearwardly to deposit its contents.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2a is a perspective view of the containment pen as in FIG. 1a;

FIG. 2b is an isolated view on an enlarged scale taken from FIG. 2a;

FIG. 2c is an isolated view on an enlarged scale taken from FIG. 2a;

FIG. 2d is an isolated view on an enlarged scale taken from FIG. 2a;

FIG. 3b is an isolated view on an enlarged scale taken from FIG. 3a;

FIG. 3c is an isolated view on an enlarged scale taken from FIG. 3a;

FIG. 3d is an isolated view on an enlarged scale taken from FIG. 3a;

FIG. 5a is a side view of the apparatus as in FIG. 1a;

FIG. 5b is an isolated view on an enlarged scale taken from FIG. 5a;

FIG. 5c is an isolated view on an enlarged scale taken from FIG. 5a;

FIG. 5d is an isolated view on an enlarged scale taken from FIG. 5a;

FIG. 6b is an isolated view on an enlarged scale taken from FIG. 6a;

FIG. 6c is an isolated view on an enlarged scale taken from FIG. 6a;

FIG. 6d is an isolated view on an enlarged scale taken from FIG. 6a;

FIG. 7b is an isolated view on an enlarged scale taken from FIG. 7a;

FIG. 7c is an isolated view on an enlarged scale taken from FIG. 7a;

FIG. 7d is an isolated view on an enlarged scale taken from FIG. 7a; and

DESCRIPTION OF THE PREFERRED EMBODIMENT

A loading and transporting apparatus according to a preferred embodiment of the present invention will now be described with reference to FIGS. 1a to 7e of the accompanying drawings. The loading and transporting apparatus 10 includes a containment pen 20 and a stabilizer bar 60 in use with a pair of loading bars operatively mounted to the bed 8 of a truck (also referred to as a truck bed 8).

The loading and transporting apparatus 10 according to the present invention is intended for use with a truck mounted loading device such as a hay bale loading having a pair of loading arms 12 pivotally or rotatably coupled to the rear end of a truck. Preferably, proximal ends 14 of the pair of loading arms 12 are connected by a connecting rod 16 that is rotatably coupled to the rear end 40 of a truck bed 8 and configured such that a rotation of the connecting rod 16 (forward or backward) causes the pair of loading arms 12 to pivot forwardly or rearwardly as will be described in more detail later.

Figure 1A:
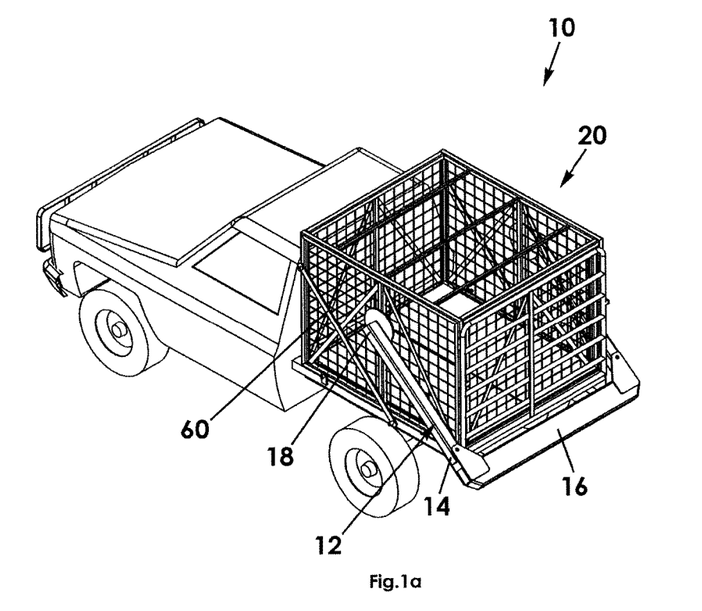
FIG. 1a is a perspective view of a loading and transporting apparatus according to a preferred embodiment of the present invention illustrating a containment pen in a loaded configuration atop a truck bed.
Figure 1B:
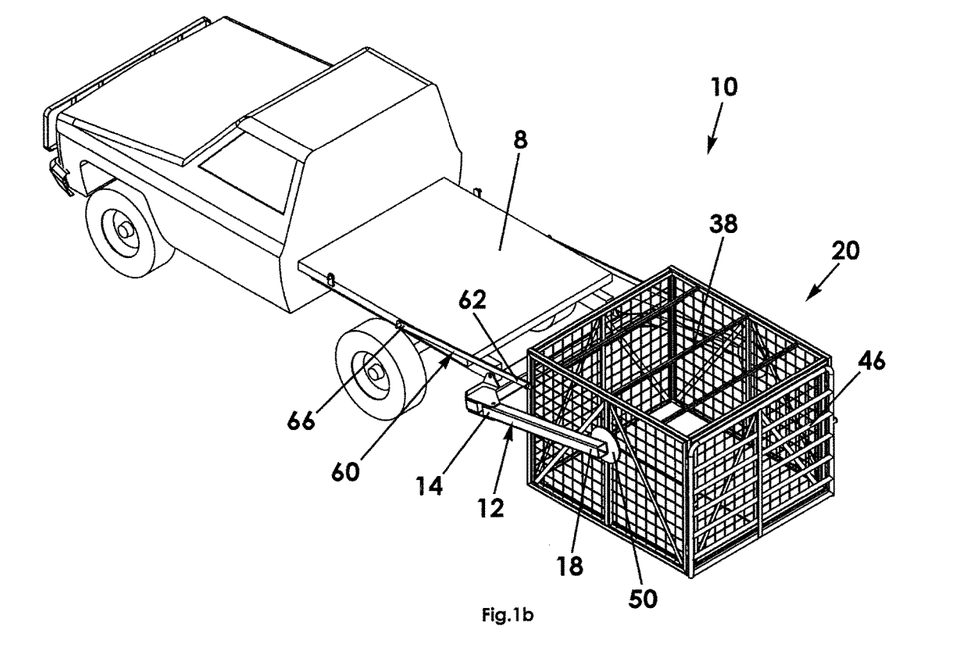
FIG. 1b is a perspective view of the apparatus as in FIG. 1a illustrating the containment pen in an unloaded configuration.
Figure 2A:
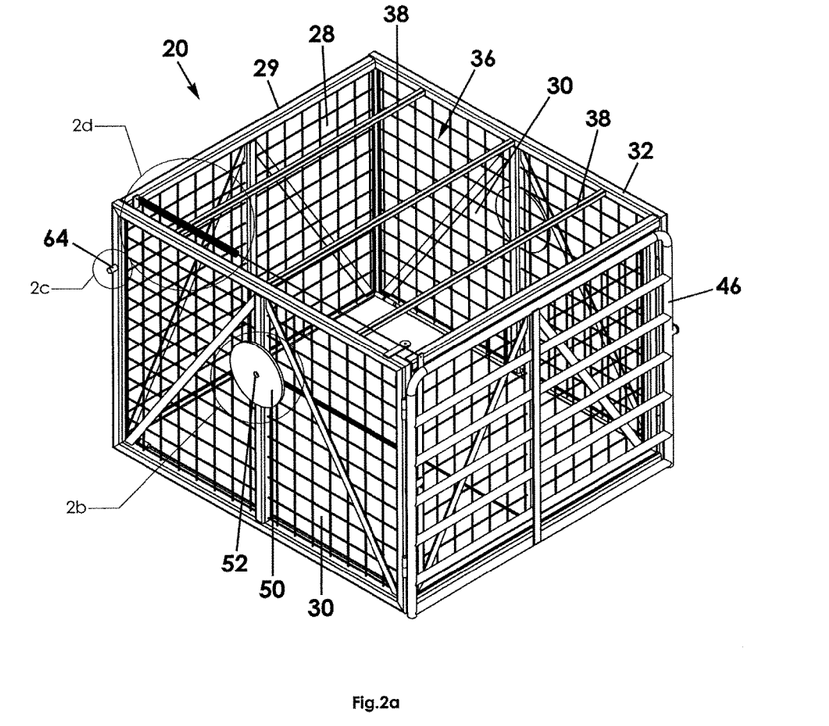
Figure 2B:
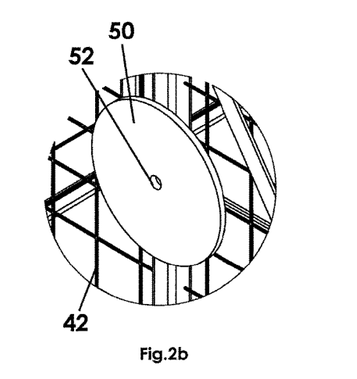
Figure 2C:
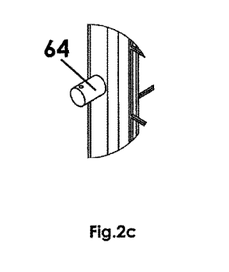
Figure 2D:
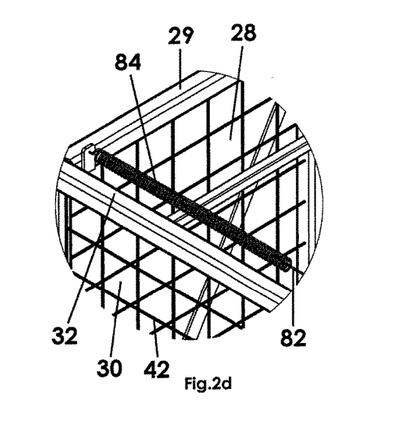
Figure 4A:
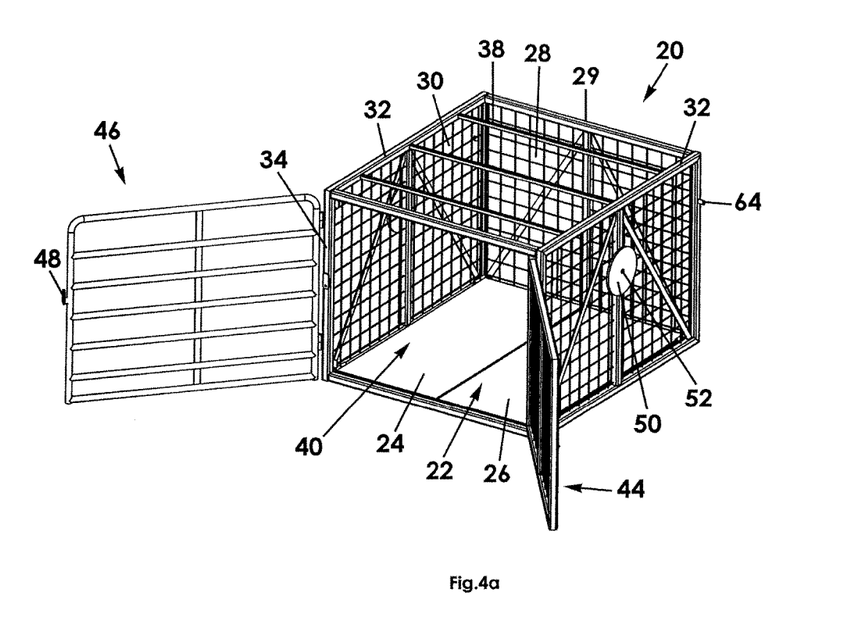
FIG. 4a is a perspective view of the containment pen as in FIG. 3a illustrating a gate and door panel in an open configuration and a floor in a closed configuration.
Figure 4B:
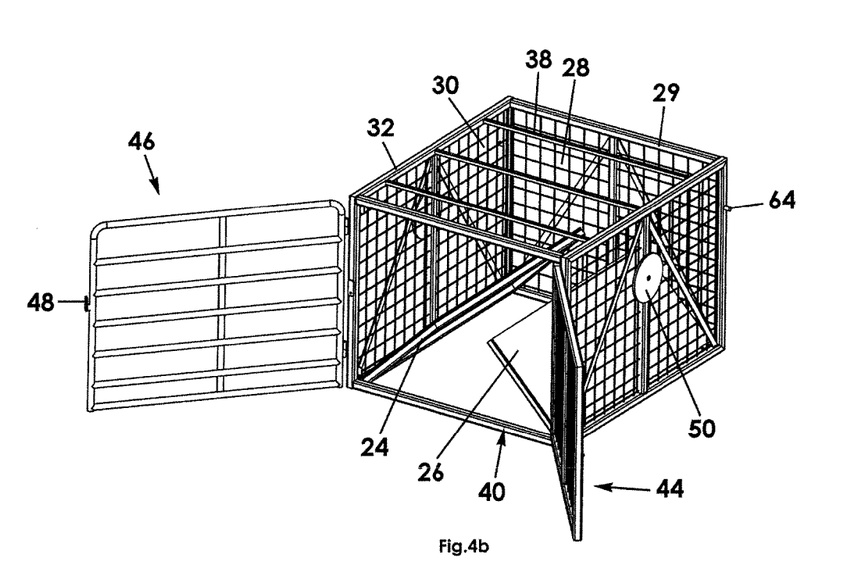
FIG. 4b is a perspective view of the containment pen as in FIG. 3a with the floor in an open configuration.

The containment pen 20 includes a floor 22 and a pair of side panels 30 extending upwardly from side edges of the floor 22. Accordingly, the side panels 30 are opposed from one another. A front panel 28 also extends upwardly from the floor 22 and extends between the opposed side panels 30. Together, the side panels 30 and front panel 28 define an interior area. In other words, the containment pen 20 defines an interior area. The side panels 30 and the front panel 28 include upper edges 32, 29, respectively, that together define an open top 36 to the containment pen 20 (FIG. 2a). In an embodiment, one or more containment bars 38 may extend across the open top 36 (FIG. 2a). Similarly, the opposed side panels 30 include front edges 34, respectively, that together define a open rear end 40 of the containment pen 20 through which access to the interior area is possible (FIG. 4a).

Preferably, the front panel 28 and each side panel 30 is a wired utility panel having a plurality of wire segments 42, the wire segments being configured in a horizontal-vertical pattern that enables one to view the interior area defined thereby but functional to hold articles inside the interior area.

Figure 3A:
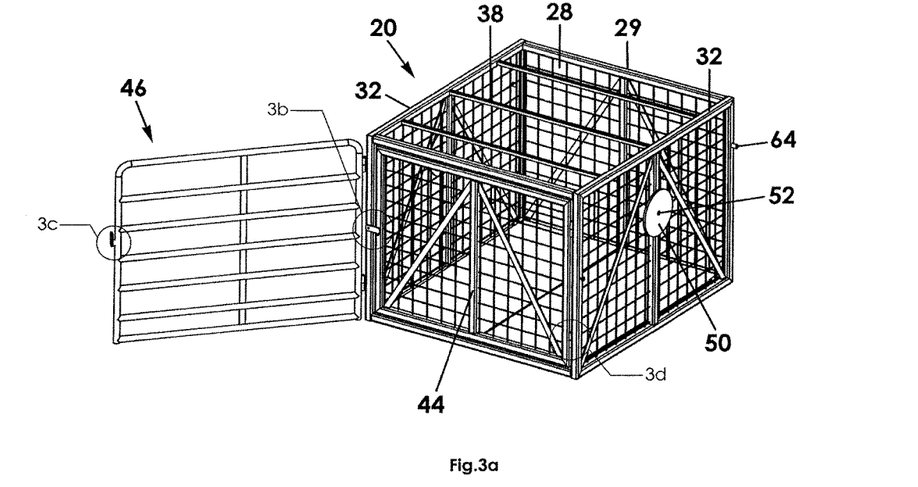
FIG. 3a is a perspective view of the containment pen as in FIG. 2a taken from another angle and illustrating a gate in an open configuration.
Figures 3B, 3C:
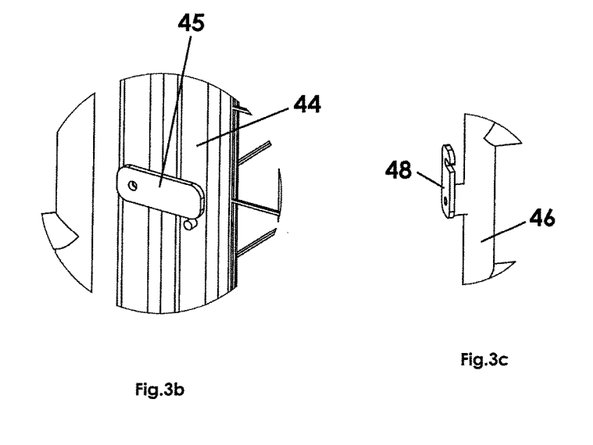
Figure 3D:
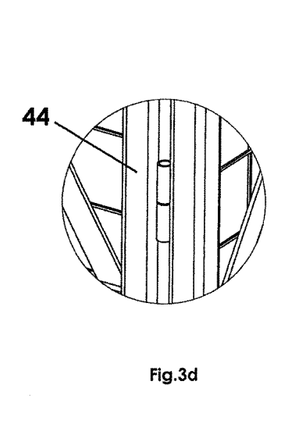

A door panel 44 is pivotally coupled to a respective front edge 34 of one of the pair of side panels 30 and is movable between a closed configuration blocking access to the interior area of the containment pen 20 and an open configuration allowing access thereto. Preferably, the door panel 44 is a wired utility panel as described previously so as to be useful in containing articles such as hay, equipment, or other articles of small to moderate size. The door panel 44 may be selectively held in the closed configuration by operation of clasp 45 or similar fastener (FIG. 3b).

Similarly, a gate 46 is pivotally coupled to a front edge of the other side panel 30 (opposite of the side panel to which the door panel 44 is coupled). The gate 46 may include a plurality of spaced apart horizontal tubular member in the nature of a stock gate. The gate 46 is movable between a closed configuration blocking access to the interior area of the containment pen 20 and an open configuration allowing access thereto. It is understood that the door panel 44 and the gate 46 have substantially the same dimensions (height and width) as the open rear end 40 of the containment pen 20 and essentially overlap one another in blocking access through the open rear end 40 when pivotally moved into their respective closed configurations (FIG. 2a). In an embodiment, the gate 46 may be swung open first (FIG. 3a) with the door panel 44 remaining in the closed configuration to contain articles within the interior area (FIG. 3a). Then, the door panel 44 may be moved to the open configuration providing access to the interior area (FIG. 4a). These overlapping configurations are made possible by the positioning of respective hinges that facilitate the pivotal of movements of the door panel 44 and gate 46. In addition, a free edge of the gate 46 may include a latch 48 or other fastener to selectively hold the gate 46 in the closed configuration.

In an embodiment, the floor 22 of the containment pen 20 includes a first floor portion 24 pivotally coupled to a lower edge of one respective side panel 30 and a second floor portion 26 pivotally coupled to a lower edge of another side panel 30. Each floor portion essentially forms one-half of the floor 22. Each floor portion 24, 26 is pivotally movable between an open configuration in which inner edges thereof extend upwardly into the interior area and allow access to the interior area and a closed configuration in which the floor portions cooperatively form a planar surface blocking access to the interior area. In use, the floor portions 24, 26 may be moved to the open configuration and the containment pen 20 may be lowered over an animal or other article to be transported. Then, the floor portions 24, 26 may be returned to the closed configuration such that the animal or article rests atop the floor 22 and is securely contained in the interior area so as to be contained or transported.

The portable loading and transporting apparatus 10 includes a pair of centering plates 50 coupled to outer surfaces of the pair of side panels 30, respectively. In an embodiment, each centering plate 50 may include a circular or disk shaped configuration defining a centered aperture 52 although a square, rectangular, or other configuration would also work. The aperture 52 is configured to receive, selectively mate with, or be otherwise fastened to a distal end 18 of a loading arm 12 that is pivotally mounted to the truck bed 8 as described above. The pair of centering plates 50 defines an imaginary horizontal axis extending therebetween about which distal ends 18 of the loading arms 12 are axially rotated when actuated. When actuated, proximal ends 14 of the pair of loading arms 12 rotate pivotally about a horizontal axis defined by the connecting rod 16. Therefore, when the loading arms 12 are coupled to the centering plates 50, the entire containment pen 20 is moved from a loaded configuration resting atop the truck bed 8 (FIG. 1a) to an unloaded configuration rearwardly displaced from the truck bed 8 (FIG. 1b), e.g. onto the ground rearwardly proximate the truck bed 8. An opposite actuation of the loading arms 12 moves the containment pen 20 from the unloaded configuration to the loaded configuration.

The coupling between the distal ends of the loading arms 12 and pair of centering plates 50, respectively, allows for pivotal rotation during the range of motion between loaded and unloaded configurations. The centering plates 50 are generally centered between upper and lower edges and between front and back edges of the side panels 30, respectively. This freedom to rotate gives the potential for the containment pen 20 to not stay level, i.e. to tip forwardly or rearwardly which can injure an animal or spill cargo contained therein. Accordingly, the portable loading and transporting apparatus 10 includes stabilizer bar 60 having a first end 62 and an opposed second end 66 and having a generally linear configuration. In an embodiment, a pair of stabilizer bars 60 is utilized—one on each side of the truck bed 8 and containment pen 20. In the embodiment of the containment pen 20 described above, the stabilizer bar 60 is selectively positioned relative to the truck bed 8 and containment pen 20 in a manner that makes sure the containment pen 20 remains in a level orientation while being moved between the loaded and unloaded configurations (or vice versa) upon actuation of the loading arms 12.

Figure 5A:
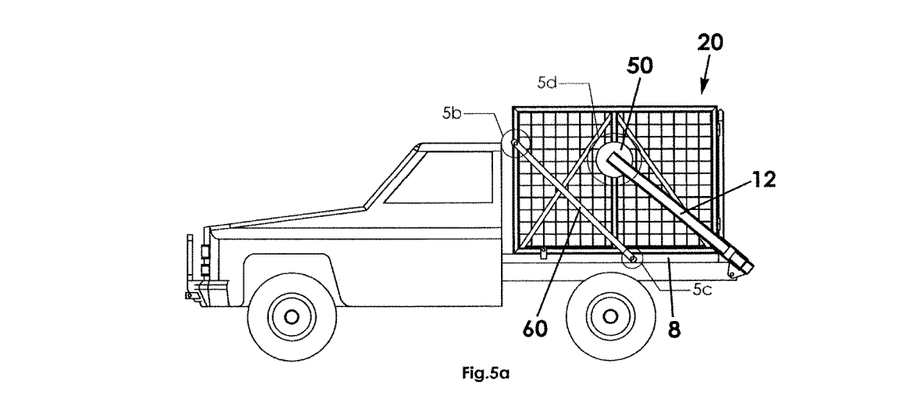
Figure 5B:
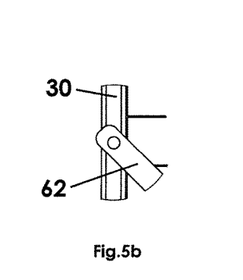
Figure 5C:
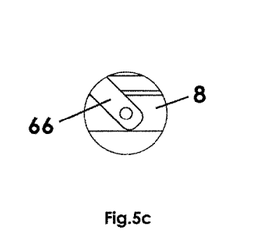
Figure 5D:
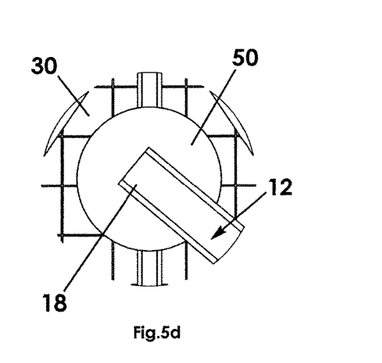
Figure 5E:
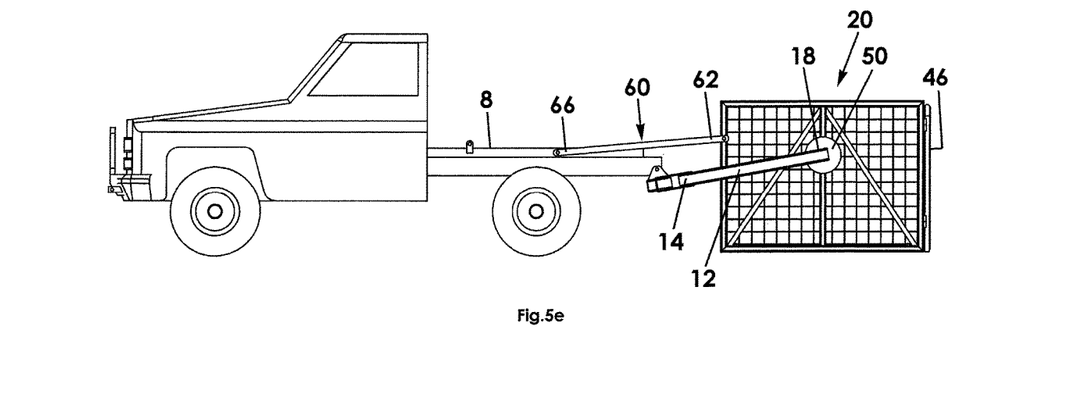
FIG. 5e is a side view of the apparatus as in FIG. 1b.
Figure 6A:
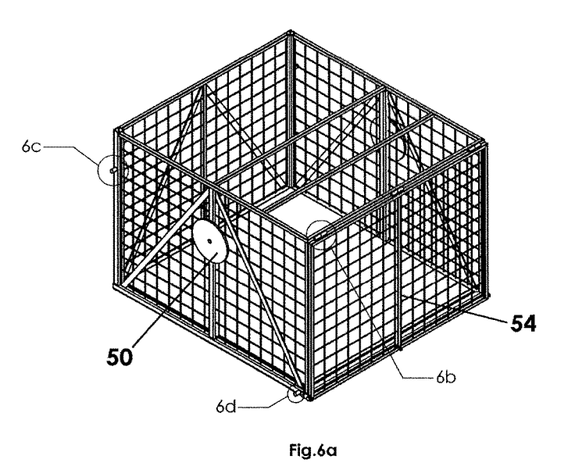
FIG. 6a is a perspective view of the containment pen according to another embodiment of the present invention.
Figure 6B:
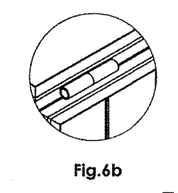
Figure 6C:
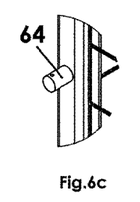
Figure 6D:
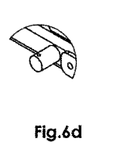
Figure 6E:
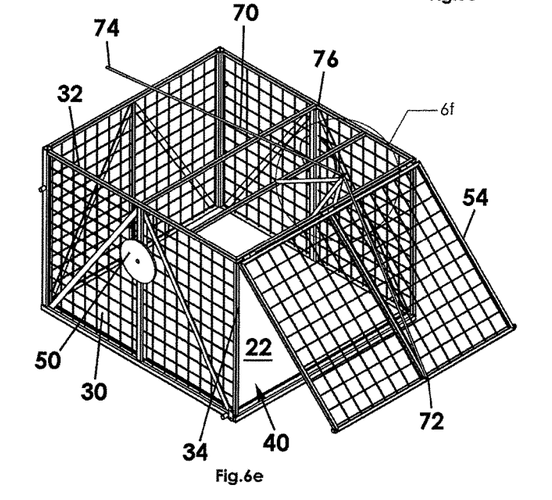
FIG. 6e is a perspective view of the containment pen as in FIG. 6a illustrating the containment gate in an open configuration.
Figure 6F:
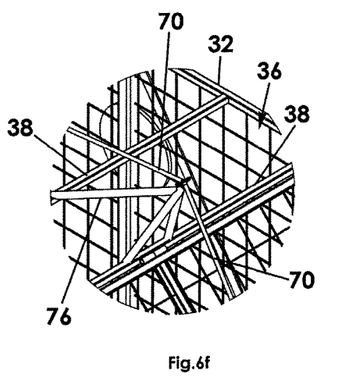
FIG. 6f is an isolated view on an enlarged scale taken from FIG. 6e.

More particularly, the first end 62 of the stabilizer bar 60 is coupled to a first position on the containment pen 20 while the second end 66 of the stabilizer bar 60 is coupled to a first position on the truck bed 8. Even more specifically, the first position on the containment pen is to a side panel 30 adjacent the front panel 28 and the first position on the truck bed 8 is at about a midpoint between front and rear ends thereof (FIGS. 5a and 5e). The first end 62 of the stabilizer bar 60 may be coupled to a flange 64 extending from the side panel 30 of the containment pen 20 and is configured to be fastened and released quickly and easily, such as with a pin. The stabilizer bar 60 is parallel to the loading arms 12 during the entire range of movement between the loaded and unloaded configurations such that containment pen 20 is held level and stable.

The stabilizer bar 60, however, can be selectively repositioned to achieve a different function. The construction and configuration of the stabilizer bar 60 itself, however, is unchanged. The first end 62 of the stabilizer bar 60 may be coupled to a second position on the containment pen 20 (such as to a flange extending therefrom) and the second end 66 of the stabilizer bar 60 may be coupled to a second position on the truck bed 8. Specifically, the second position on the containment pen 20 is on a respective lower edge of a side panel 30 adjacent the open rear end 40. The second position on the truck bed 8 is adjacent the front thereof such that the first end 62 of the stabilizer bar 60 defines a fulcrum causing the containment pen 20 to tip rearwardly toward the open rear end 40 when the containment pen 20 is moved from the loaded configuration (FIG. 7a) toward the unloaded configuration (FIG. 7b) as described previously.

Figure 7A:
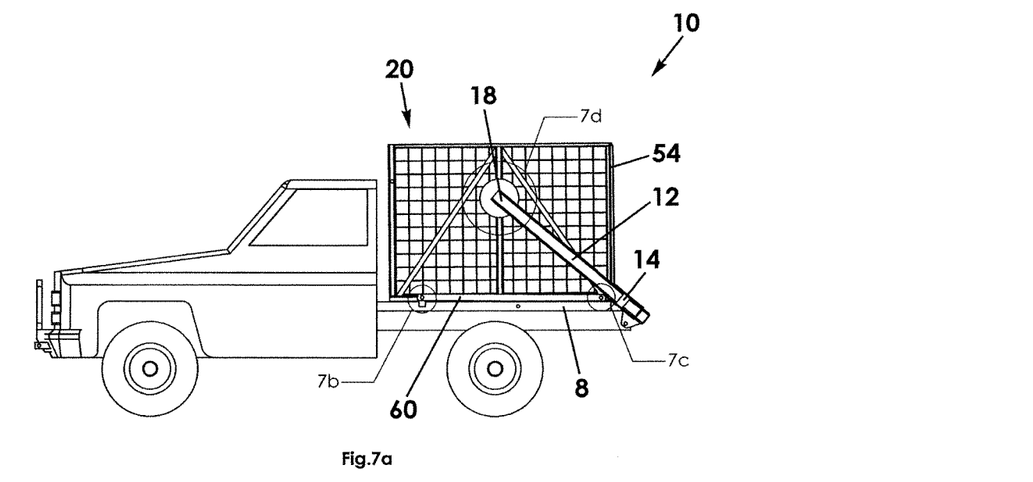
FIG. 7a is a side view of the apparatus as in FIG. 6a illustrated in a loaded configuration on a truck bed.
Figure 7B:
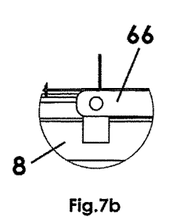
Figure 7C:
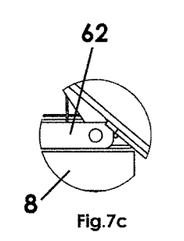
Figure 7D:
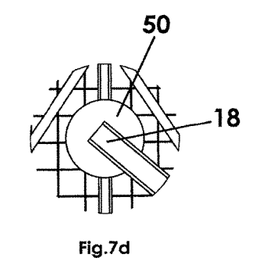
Figure 7E:
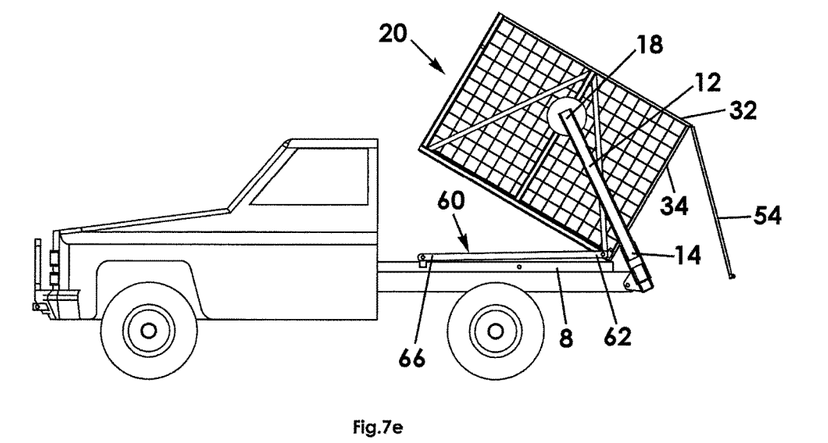
FIG. 7e is a side view of the apparatus as in FIG. 7a illustrated in an unloaded configuration.

In one embodiment, the open rear end 40 is selectively enclosed by a containment gate 54. The containment gate 54 is interchanged for the door panel 44 and gate 46 described previously. The containment gate 54 includes an upper edge pivotally coupled to respective upper ends of respective side panels adjacent the open rear end 40 of the containment pen 20. The containment gate 54 is selectively movable between a closed configuration that blocks access to the interior area via the open rear end 40 (FIG. 7a) and an open configuration allowing access to the interior area (FIG. 7e). When used with the stabilizer bar 60 in the second positions as described above, the containment pen 20 is tipped rearwardly to dump its contents when the loading arms 12 are actuated to move the containment pen 20 toward the unloaded configuration.

A gate opening assembly may be utilized for selectively and easily moving the containment gate 54 between the open and closed configurations. More particularly, the gate opening assembly may include a rope 70 or cable and an operational bracket 76. The operational bracket 76 may be mounted atop the containment pen 20, such as to a containment bar 38 extending across the open top 36. The rope 70 has an elongate configuration that includes a first end 72 coupled to a lower edge of the containment gate 54, extends over or through the operational bracket 76, and includes a second end 74 displaced from and opposed to the first end 72. The gate opening assembly works like a pulley system such that pulling on the second end 74 of the rope 70 correspondingly opens the containment gate 54.

In an embodiment, the door panel 44 and/or gate 46 described previously may also be operatively coupled to an opening system (FIG. 2a). The opening system may include a cable 82 coupled at one end to the gate 46 and/or door panel 44 and, at another end to a spring 84. In this assembly, the spring 84 acts to automatically bias the gate 46 and door panel 44 to move toward their closed configurations, respectively.

In use, the containment pen 20 may be coupled to distal ends 18 of the loading arms 12 of a hay bale loading that is already mounted to a truck bed 8. This is best accomplished while the containment pen 20 is positioned on the ground behind the truck bed 8. Then, the containment pen 20 may be loaded with cargo by opening the gate 46 and door panel 44 as described above. After closing and securing the gate 46 and door panel 44, actuation of the loading arms 12 moves the containment pen 20 to the loaded configuration atop the truck bed 8 so that the containment pen 20 may be transported to another location and again returned to an unloaded configuration by operation of the loading arms 12 in a rearward direction. In one embodiment of the containment pen 20, movement of the pen 20 toward the unloaded configuration results in a rearward tipping so that the cargo is essentially dumped out onto the ground rearward of the truck bed 8.

It is understood that while certain forms of this invention have been illustrated and described, it is not limited thereto except insofar as such limitations are included in the following claims and allowable functional equivalents thereof.

The invention claimed is:

1. A portable loading and transporting apparatus for use with a bale loading device having a pair of loading arms pivotally coupled to a rear end of the bed of a truck, said portable loading and transporting apparatus comprising:
   a containment pen having a floor, a pair of opposed side panels extending upwardly from respective side edges of said floor, and a front panel extending between said side panels;
   a pair of centering plates mounted to said opposed side panels, respectively, said pair of centering plates being pivotally coupled to respective distal ends of the pair of loading arms such that said containment pen is operatively moved between a loaded configuration atop the bed of the truck and an unloaded configuration on the ground rearwardly proximate the bed of the truck when the loading arms are actuated;
   a stabilizer bar having a first end selectively coupled to a first position on said containment pen and a second end selectively coupled to a first position on the bed of the truck, said stabilizer bar configured to maintain said containment pen in a level configuration when said containment pen is moved between said loaded and said unloaded configurations by operation of the loading arms;
   wherein said centering plates are generally centered between respective upper and lower edges and respective front and back edges of respective side panels such that said containment pen is generally balanced while being moved between said loaded and unloaded configurations by the loading arms.

2. The portable loading and transporting apparatus as in claim 1, wherein:

an upper edge of said front panel and upper edges of said opposed side panels, respectively, of said containment pen define an open top; and front edges of said opposed side panels of said containment pen define an open rear end.

3. The portable loading and transporting apparatus as in claim 1, further comprising:

a door panel pivotally coupled to a front edge of one said side panel of said containment pen, said door panel being movable between a closed configuration blocking access to an interior area defined by said containment pen and an open configuration allowing access to the interior area; and a gate pivotally coupled to a front edge of another said side panel of said containment pen, said gate being movable between a closed configuration blocking access to the interior area defined by said containment pen and an open configuration allowing access to the interior area.

4. The portable loading and transporting apparatus as in claim 3, wherein:

said door panel is a wire panel door configured to hold articles inside the interior area of said containment pen; and said gate includes a plurality of horizontally disposed tubular members.

5. The portable loading and transporting apparatus as in claim 1, wherein said first end of said stabilizer bar is selectively coupled to a second position on said containment pen and said second end of said stabilizer bar is selectively coupled to a second position on the truck bed such that said containment pen is allowed to tilt toward said open front when said containment pen is moved between said loaded and said unloaded configurations by operation of the loading arms.

6. The portable loading and transporting apparatus as in claim 5, wherein:

said second position on said containment pen is on a respective lower edge of a respective side panel adjacent said rear end; and said second position on the truck bed is adjacent a front of the truck bed such that said first end of said stabilizer defines a fulcrum causing said containment pen to tip toward said open rear end when said containment pen is moved between said loaded and said unloaded configurations by operation of the loading arms.

7. The portable loading and transporting apparatus as in claim 1, wherein:

said first position on said containment pen is on one side panel adjacent said front panel; and said first position on the truck bed is about midway between a front of the truck bed and a rear end of the truck bed.

8. The portable loading and transporting apparatus as in claim 1, wherein said pair of centering plates define an imaginary longitudinal axis extending therebetween about which distal ends of the pair of loading arms is selectively rotated when moving between said loaded and said unloaded configuration.

9. The portable loading and transporting apparatus as in claim 1, further comprising a containment gate pivotally coupled to respective upper ends of said pair of opposed side panels adjacent said open rear end, said containment gate being movable between a closed configuration that blocks access into an interior area defined by said opposed side walls and said front wall of said containment pen and a released configuration selectively providing access to said interior area of said containment pen.

10. The portable loading and transporting apparatus as in claim 9, wherein:

said containment gate includes a gate opening assembly having a rope and an operational bracket;

wherein said operational bracket is mounted proximate an upper end of said containment gate;

wherein said rope includes a first end coupled to a lower end of said containment gate and a second end displaced from said first end, said rope having an elongate configuration that operatively extends in contact with said operational bracket and is configured such that said containment gate is selectively movable between said closed and open configurations by pulling on said second end of said rope.

11. The portable loading and transporting apparatus as in claim 1, wherein said floor includes:

a first floor portion pivotally coupled to a lower edge of one respective side wall panel;

a second floor portion pivotally coupled to a lower edge of another respective side wall panel;

wherein said first and second floor portions are selectively movable between an open configuration each extending upwardly so as to allow access to an interior of said containment pen and a closed configuration not allowing access to the interior of said containment pen.

12. The portable loading and transporting apparatus as in claim 1 wherein said opposed side panels and said front panel are wire utility panels.

* * * * *